United States Patent [19]

Ikeda

[11] Patent Number: 5,151,876

[45] Date of Patent: Sep. 29, 1992

[54] READ-ONLY MEMORY HAVING DATA REGISTER FOR HOLDING OUTPUT DATA

[75] Inventor: Toshio Ikeda, Hyogo, Japan

[73] Assignee: Mitsubishi Denki Kabushiki Kaisha, Tokyo, Japan

[21] Appl. No.: 389,142

[22] Filed: Aug. 3, 1989

[30] Foreign Application Priority Data

Aug. 6, 1988 [JP] Japan .................. 63-196860

[51] Int. Cl.$^5$ .............................................. G11C 7/00
[52] U.S. Cl. ........................................ 365/94; 395/200
[58] Field of Search ................... 365/189.05, 219, 221, 365/233, 94; 364/519

[56] References Cited

U.S. PATENT DOCUMENTS

| | | | |
|---|---|---|---|
| 3,964,591 | 6/1976 | Hill et al. | 400/126 |
| 4,289,411 | 9/1981 | Cornelius et al. | 400/126 |
| 4,402,067 | 8/1983 | Moss et al. | 365/96 |
| 4,646,259 | 2/1987 | Lincoln et al. | 364/519 X |
| 4,829,484 | 5/1989 | Arimoto et al. | 365/189.05 |

OTHER PUBLICATIONS

Makoto Ishihara et al., "Kanji Serial Printer PC-PR201, 101, 201CL" NEC Technical Journal, vol. 38, No. 3 (Feb. 20, 1985), pp. 98-102. English Translation.

Makoto Ishihara et al., "Kanji Serial Printer PC-PR201, 101, 201CL".

NEC Technical Journal, vol. 38, No. 3 (Feb. 20, 1985). Technical data sheets for micro PD23C1000C, 23C1000D, and PD731002C CMOS ROMs (publication date not available).

Primary Examiner—Joseph A. Popek
Attorney, Agent, or Firm—Lowe, Price, Le Blanc & Becker

[57] ABSTRACT

A data register is provided through a column gate circuit in a ROM array in which font information is stored. Desired font information is read out as parallel data through the column gate circuit based on address information inputted to a row decoder and a column decoder. The data read out is stored once in the data register. Thereafter, the parallel data stored in the data register is outputted to a printing output circuit as serial data in synchronization with reception by a printing output circuit, thereby to perform printing processing. Consequently, font information to be printed need not be stored in a RAM or the like through a data bus, so that processing is simplified and the speed of a processing operation is increased.

8 Claims, 6 Drawing Sheets

READ-ONLY MEMORY HAVING DATA REGISTER FOR HOLDING OUTPUT DATA

BACKGROUND OF THE INVENTION

1. Field of the Invention

The present invention relates generally to memory circuits, and more particularly, to a memory circuit for efficiently reading out font information stored in a read-only memory (referred to as ROM hereinafter) and transferring the same to a printer.

2. Description of the Background Art

FIG. 4 is a block diagram for explaining a structure of a printer comprising this type of memory circuit. A CPU (Central Processing Unit) 21 reads out a font required for printing processing based on a control program stored in a ROM 22 and controls driving of a printing portion or the like. A RAM (Random Access Memory) 23 stores data to be printed and work information stored in the CPU 21. A control bus 20, an address bus 24, and a data bus 25 respectively transfer a control signal, an address signal and a data signal, to exchange various signals among the circuits. A read-only memory (font ROM) 26 serving as a font memory stores a font pattern corresponding to a character code. A printing output circuit 27 receives font data read out from the font ROM 26 under the control of the CPU 21 and drives a printer head 28, thereby to print character information on a predetermined output paper.

FIG. 5 is a block diagram showing one example of a read-out circuit of the font ROM 26 shown in FIG. 4. A ROM array 31, which comprises, for example, a total of 65536 words×8 bits in 1024 rows and 64 columns, stores a font pattern to be a character corresponding to a character code.

A row decoder 32 decodes a row address signal transmitted through address lines $A_{15}$ to $A_6$ included in the address bus 24. The column decoder 33 decodes a column address signal transmitted through address lines $A_5$ to $A_0$ included in the address bus 24, to output the decoded column address signal to a column gate circuit 34.

A chip enable signal CE and an output enable signal OE are inputted to a timing generator 35 from the CPU 21 through the control bus 20. A timing output signal To which is an AND output of the signals CE and OE, to be inputted to an output buffer 36. Potentials on bit lines in a selected column is amplified in response to the signal To. Consequently, printing font data is outputted to 8-bit data bus lines $D_0$ to $D_7$ included in the data bus 25.

Referring now to a timing chart of FIG. 6, description is made of an operation of the printer shown in FIGS. 4 and 5.

The CPU 21 stores printing information in the RAM 23 based on a control program stored in the ROM 22. When a printing start command is inputted from the exterior, the CPU 21 outputs a row address signal and a column address signal to the row decoder 32 and the column decoder 33 through the address line $A_{15}$ to $A_6$ and $A_5$ to $A_0$ in order to extract to the data bus 25 font data stored in the ROM array 31 in the font ROM 26.

Consequently, an address to be accessed in the ROM array 31 is determined, so that the font data is read out to the column gate circuit 34. The font data is accepted in the output buffer 36 in response to a timing output signal To from the timing generator 35 (see the timing chart of FIG. 6). Then, printing font data is outputted through the 8-bit data bus lines $D_7$ to $D_0$ as parallel information, to be stored once in the RAM 23 through the data bus 25. Thereafter, transmission of the font data is synchronized with reception by the printing output circuit 27 and then, the printing font data is outputted to the printing output circuit 27 through the data bus 25 in response to a control signal of the CPU 21. The printer head 28 is driven based on the font data.

If and when the conventional memory circuit is utilized, particularly the ROM array is utilized as a font ROM, the above described memory access by the CPU 21 must be made several times until desired character font information is outputted, so that read-out efficiency is significantly decreased. Therefore, an attempt to deal with the decrease by increasing the number of output buffers 36 causes a disadvantage peculiar to the memory circuit that a circuit structure is complicated.

As described in the foregoing, the ROM array is most suitable as a program memory. However, the use of the ROM array as a font ROM is not efficient because reading processing is complicated.

SUMMARY OF THE INVENTION

An object of the present invention is to achieve efficient reading in a read-only memory.

Another object of the present invention is not to require an external storage area, in which information read is to be stored, in a read-only memory.

Still another object of the present invention is to directly transfer font data as printing data from an area, in which the data is stored to the side of a printer head of a printer.

A further object of the present invention is not to require complicated control at the time of printing in a printer.

A still further object of the present invention is to perform printing processing at high speed in a printer.

In order to attain the above described objects, a memory device according to the present invention comprises a memory array, addressing means, information reading means, and information holding means. The memory array has a plurality of addresses, in each of which information is stored. The addressing means designates an address in the memory array. The information reading means reads out information in the designated address in response to a designated output of the addressing means. The information holding means holds the information read out.

The memory device structured as described above does not require a region in which information read out to the exterior is to be held since the device has information holding means therein. As a result, an efficient reading operation can be performed.

In order to attain the above described objects, a printer according to the present invention comprises storing means, printing data outputting means, commanding means, designating means, and data reading means. The storing means stores font data. The printing data outputting means outputs font data for printing to a printer head. The commanding means issues a command to start a printing operation. The designating means designates font data to be printed. The data reading means reads out the designated font data as printing data from the storing means to the printing data outputting means in response to a commanded output of the commanding means.

In the printer structured as described above, font data stored in the storing means is directly outputted as printing data and processed, so that processing is quickly performed and complicated reading control is not required.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
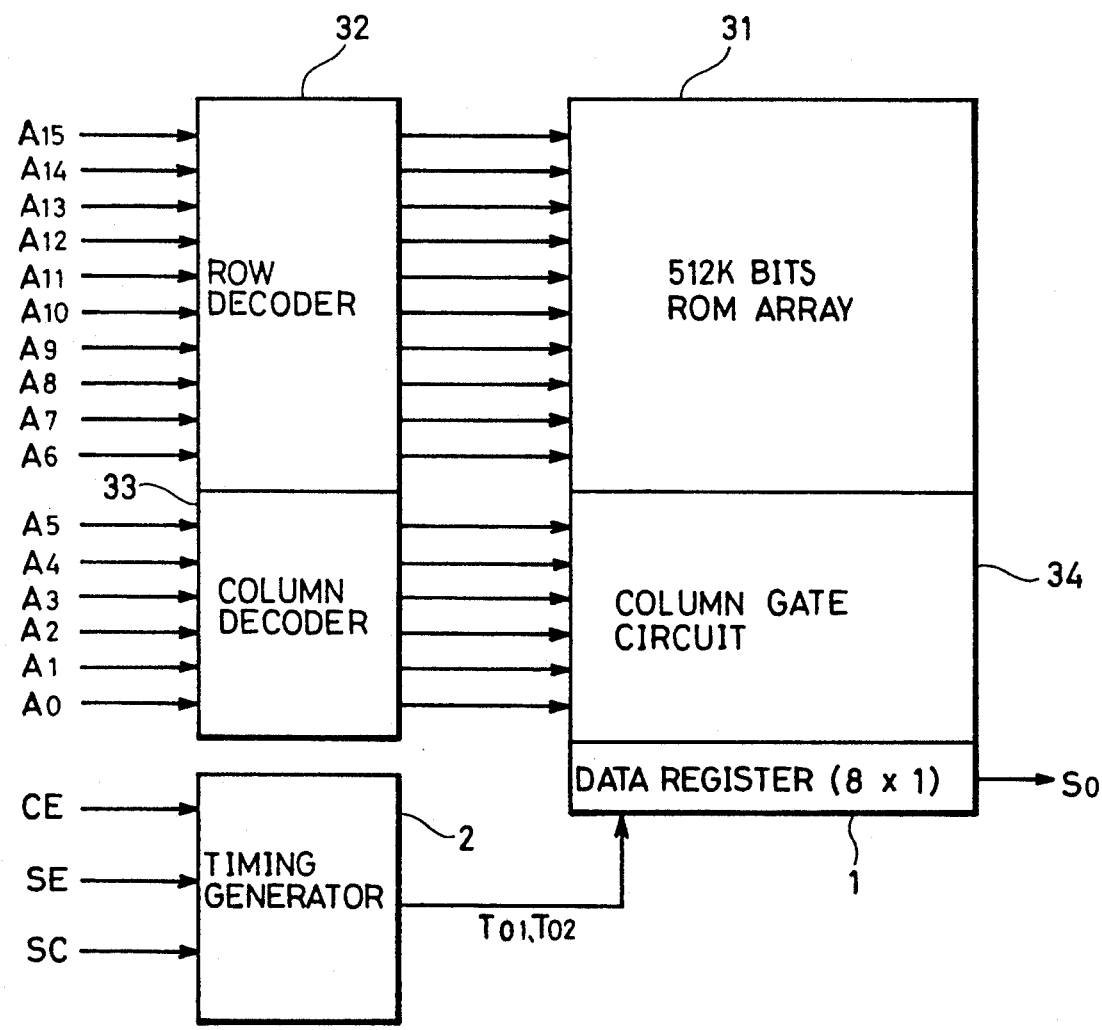
FIG. 1 is a block diagram showing a structure of a memory circuit according to an embodiment of the present invention.

FIG. 1 is a block diagram for explaining a structure of a memory circuit according to an embodiment of the present invention.

Referring now to FIG. 1, description is made of the structure of the memory circuit. A data register 1 accepts parallel data of, for example, 1 word × 8 bits from a column gate circuit 34 and holds the same. A chip enable signal CE, a serial enable signal SE and a serial clock signal SC are inputted to a timing generator 2 from a CPU 21 through a control bus. A timing output signal TO1 which is an AND output of the signals CE and SE and a timing output signal TO2 which is an AND output of the signals SE and SC are respectively generated, to be inputted to the data register 1. The parallel data of 1 word × 8 bits is accepted in the data register 1 and held therein in synchronization with the inputted timing output signal TO1. Serial data SO is outputted from the data register 1 in synchronization with the inputted timing output signal TO2.

Figure 2:
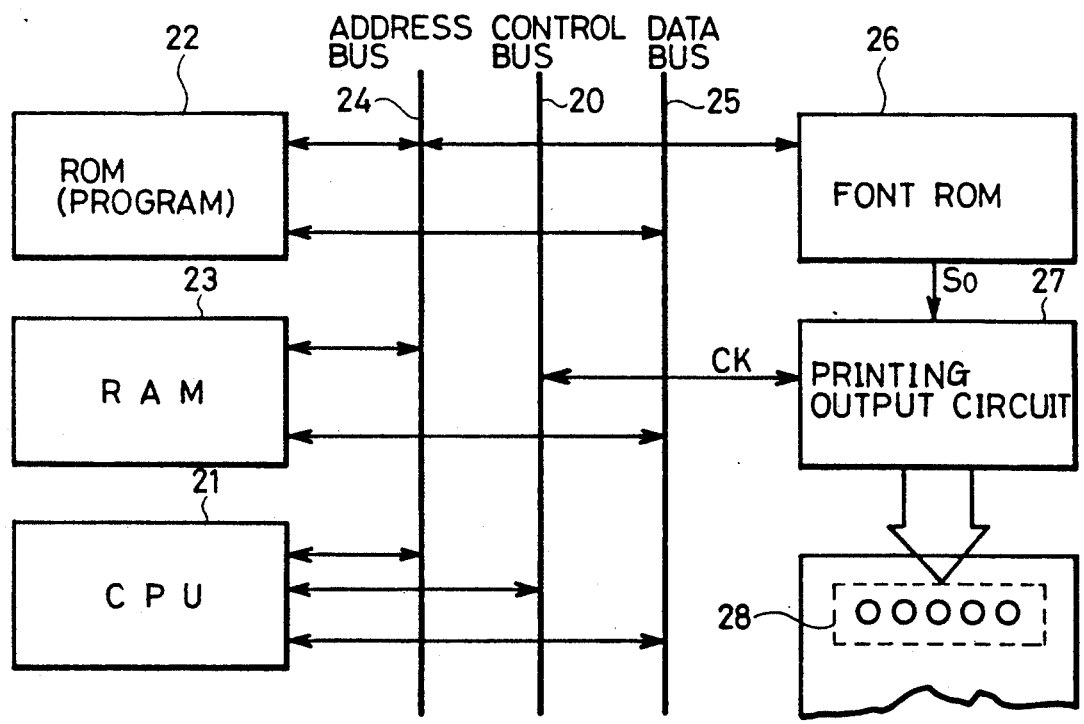
FIG. 2 is a block diagram showing a structure of a printer using the memory circuit shown in FIG. 1.
Figure 3:
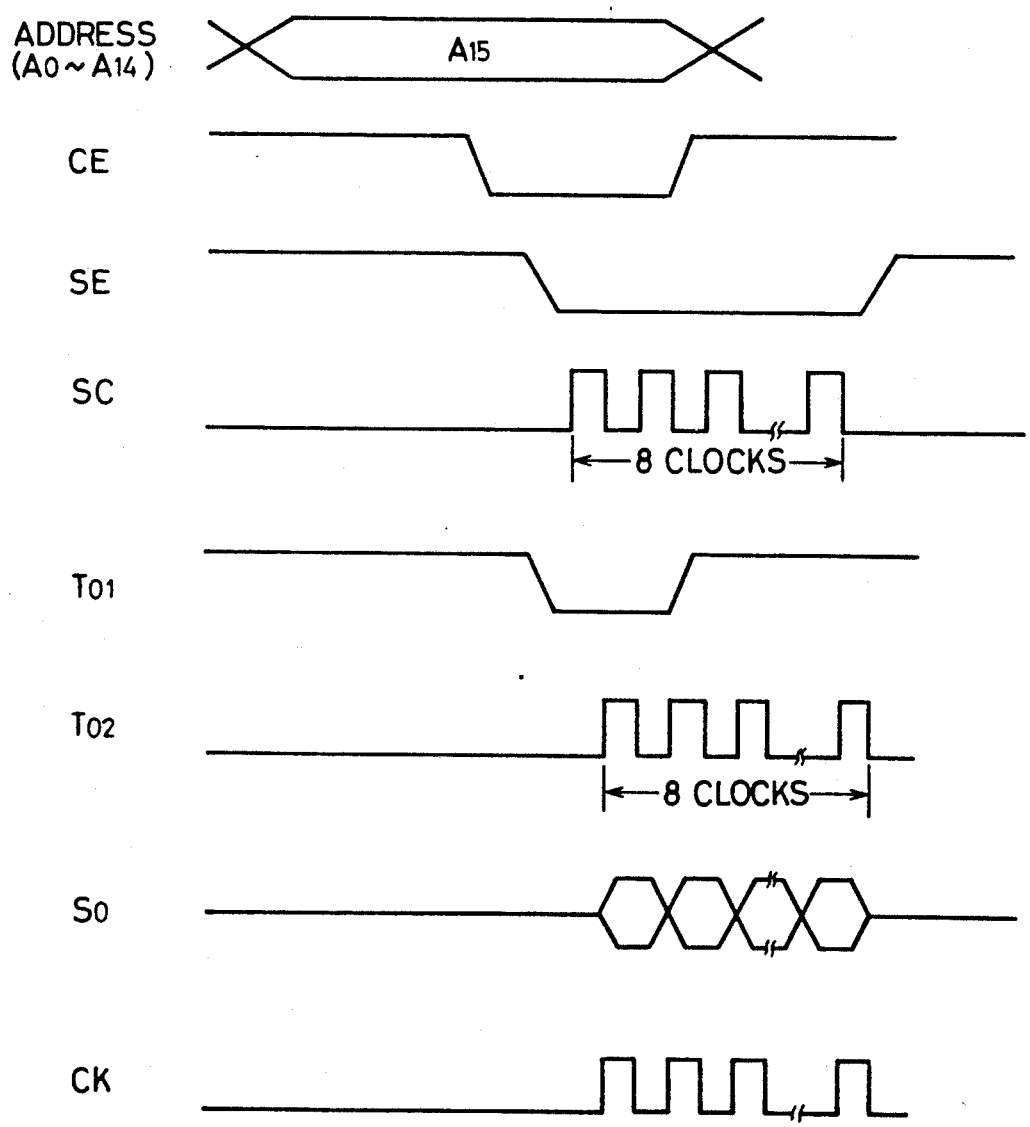
FIG. 3 is a timing chart for explaining an operation of the printer shown in FIGS. 1 and 2.
Figure 4:
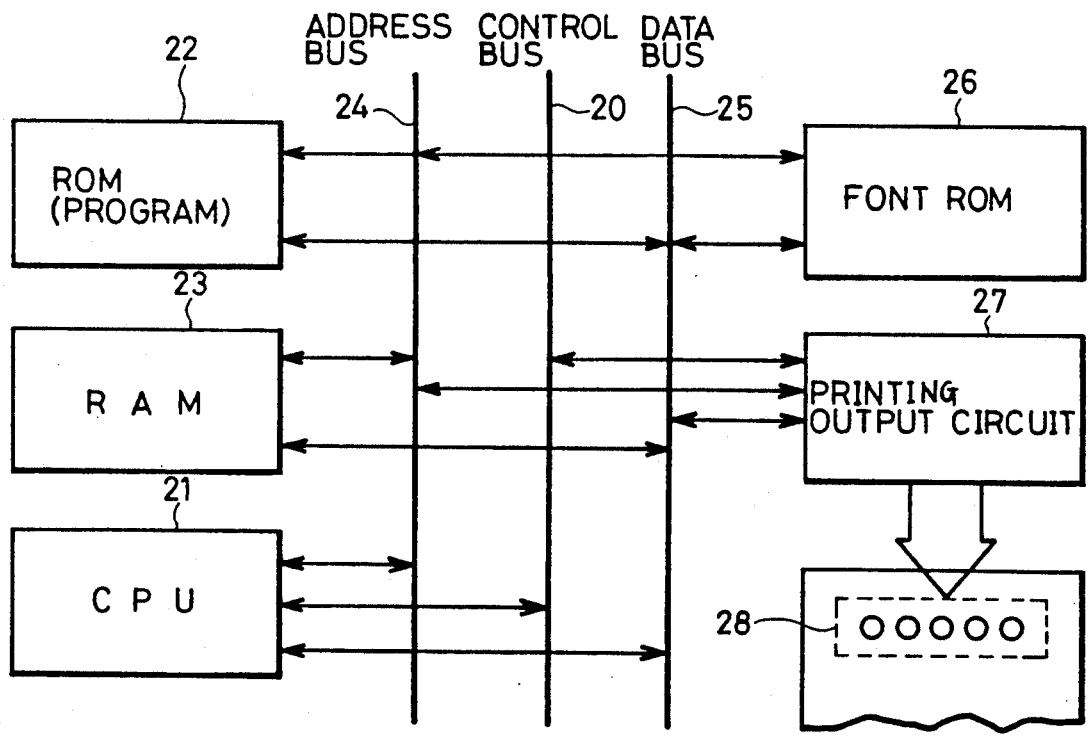
FIG. 4 is a block diagram showing a structure of a conventional printer.
Figure 5:
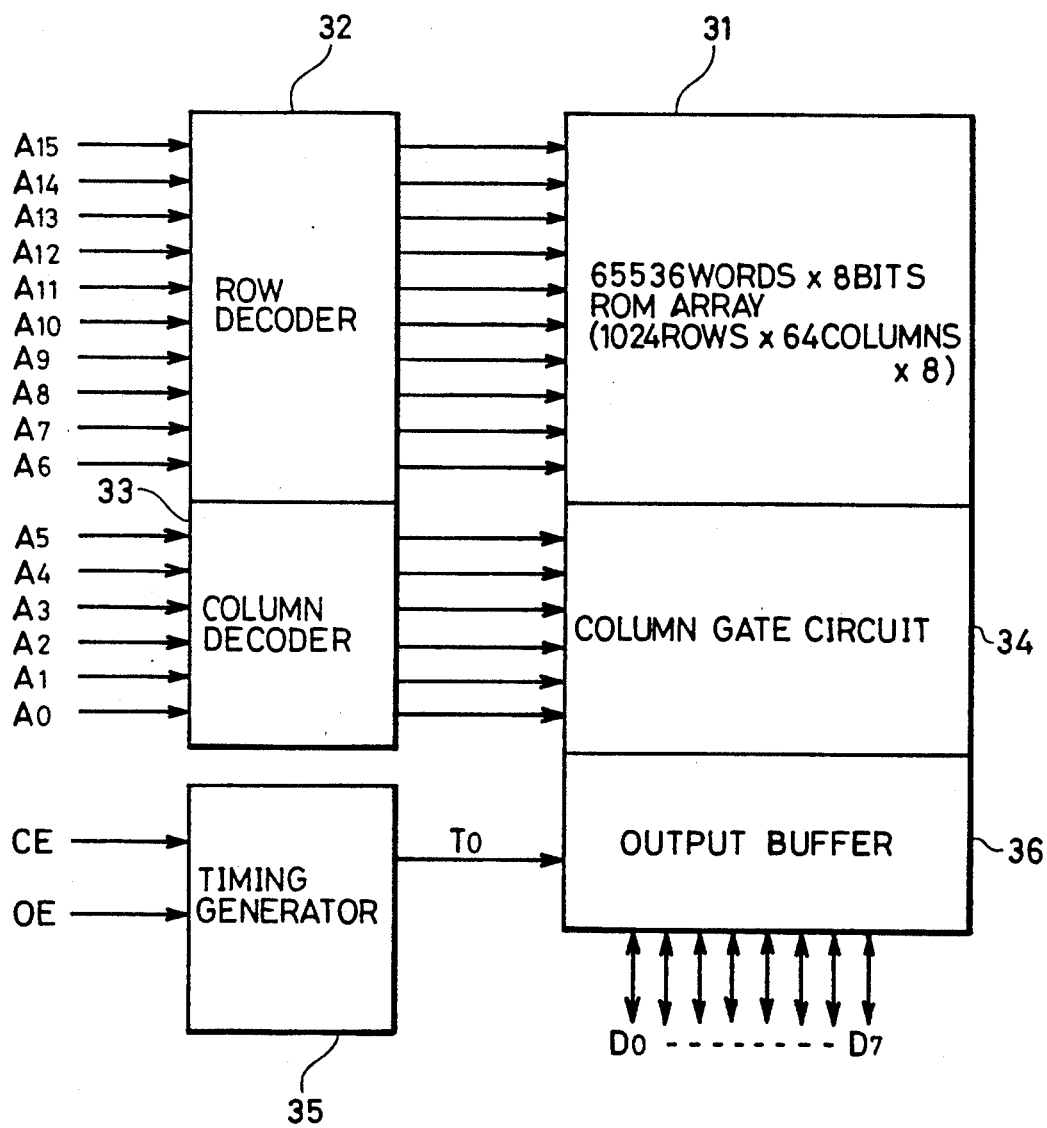
FIG. 5 is a block diagram showing a structure of a read-out circuit of a font ROM shown in FIG. 4.
Figure 6:
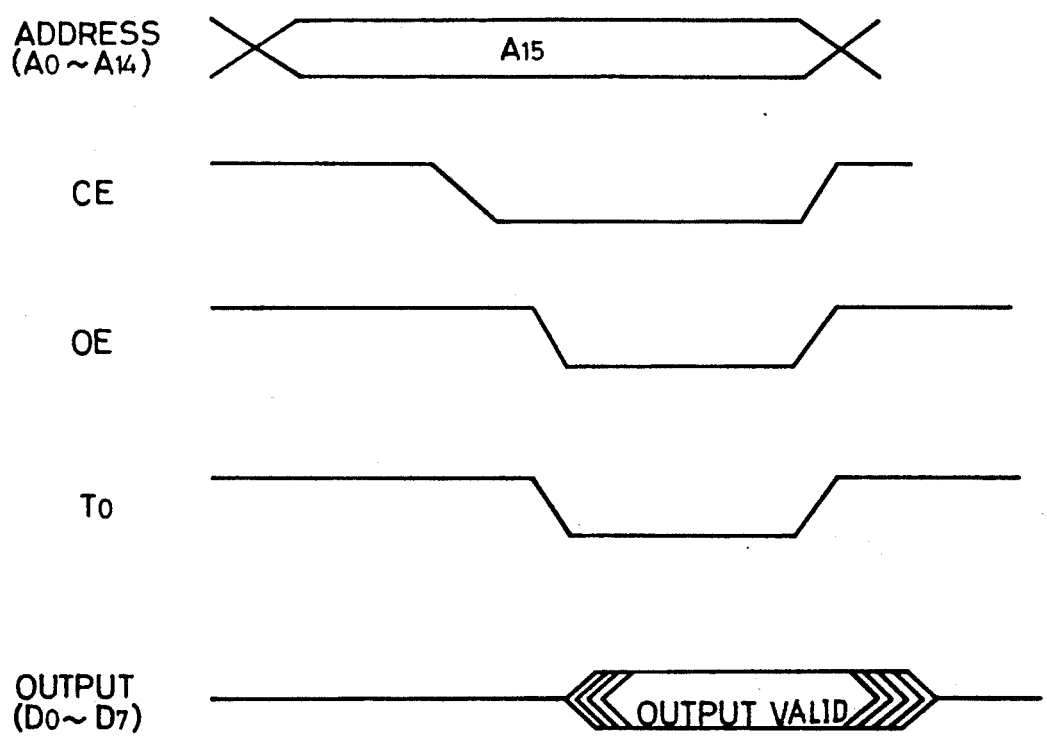
FIG. 6 is a timing chart for explaining an operation of the conventional printer shown in FIGS. 4 and 5.

FIG. 2 is a block diagram for explaining a structure of a printer to which the memory circuit shown in FIG. 1 is applied. FIG. 3 is a timing chart for explaining an operation of the printer according to the embodiment of the present invention. Portions identical and corresponding to those shown in FIG. 4 as a conventional example have the same reference numerals.

Referring now to FIGS. 1 to 3, description is made of parallel data/serial reading processing according to the embodiment of the present invention.

A CPU 21 stores printing information in a RAM 23 based on a control program stored in a ROM 22. When a printing start command is inputted from the exterior, the CPU 21 outputs a row address signal and a column address signal to a row decoder 32 and a column decoder 33 through address lines $A_{15}$ to $A_6$ and $A_5$ to $A_0$ in order to extract to a data bus 25 font data stored in a ROM array 31 in a font ROM 26.

Consequently, an address to be accessed in the ROM array 31 is determined, so that the font data is read out to the column gate circuit 34. Then, the timing output signals TO1 and TO2 are generated from the timing generator 2 at timing shown in FIG. 3 and inputted to the data register 1.

The 8-bit font data is outputted to the data register 1 in response to the timing output signal TO1 and stored once therein. Then, a clock signal CK for defining timing of reception of a printing output circuit 27 is inputted to the printing output circuit 27 from the CPU 21 through a control bus 20. The 8-bit parallel font data is outputted to the printing output circuit 27 as serial font data SO in synchronization with the timing output signal TO2 matching the signal CK.

Accordingly, memory access by the CPU 21 is not required, so that the font data from the font ROM 26 can be directly outputted to the printing output circuit 27 as serial data. More specifically, the font ROM 26 can be accessed while significantly decreasing the burden of processing of the CPU 21.

Although in the above described embodiment, description was made of a case in which 8 bits of the data register 1 is one word and the serial data SO is outputted for each line, the number of words and the number of outputs for each line may be plural, to which case the present invention can be applied.

Additionally, the font ROM 26 may be a mask ROM and a memory device such as an EPROM (Erasable Programmable Read-Only Memory) and an EEPROM (Electrically Erasable Programmable Read-Only Memory), to which case the present invention can be applied.

As described in the foregoing, the memory device according to the present invention has a data register capable of holding information read out thereto, so that an area for holding information is not required outside of the device. Thus, in a printer including this memory device, font data stored is directly processed as printing data, so that printing processing can be quickly performed and control of reading of the data is not complicated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A read-only memory for supplying font data to a printer, comprising:
   a read-only memory array having a plurality of cells in each of which said font data is capable of being stored,
   decoder means responsive to an externally applied address signal for reading out said font data as parallel data from the address designated;
   information holding means for holding said parallel data read out from said read-only memory array and supplying said font data as serial data in response to an externally applied clock signal received from said printer; and
   first command signal generating means for generating a first command signal,
   said information holding means holding said read out information in response to said first command signal generated by said first command signal generating means.

2. A read-only memory for supplying font data to a printer, comprising:

a read-only memory array having a plurality of cells in each of which said font data is capable of being stored, decoder means responsive to an externally applied address signal for reading out said font data as parallel data from the address designated;

first command signal generating means for generating a first command signal;

second command signal generating means for generating a second command signal in response to an externally applied clock signal received from said printer;

information holding means for holding said parallel data read out from said read-only memory array and supplying said font data as serial data, said information holding means holding said read out information in response to said first command signal generated by said first command signal generating means and outputting said held information as serial font data in response to said second command signal generated by said second command signal generating means.

3. The read-only memory according to claim 2 wherein said font data is inalterably and permanently stored in said plurality of memory cells.

4. A read-only memory for supplying font data to a printer, comprising:

a read-only memory array having a plurality of cells in each of which said font data is capable of being stored, decoder means responsive to an externally applied address signal for reading out said font data as parallel data from the address designated, said decoder means including a row decoder and a column decoder, said address being designated based on address information applied to said row decoder and said column decoder; and information holding means for holding said parallel data read out from said read-only memory array and supplying said font data as serial data in response to an externally applied clock signal received from said printer.

5. A read-only memory for supplying font data to a printer, comprising:

a read-only memory array including a mask ROM having a plurality of cells in each of which said font data is capable of being stored, decoder means responsive to an externally applied address signal for reading out said font data as parallel data from the address designated; and information holding means for holding said parallel data read out from said read-only memory array and supplying said font data as serial data in response to an externally applied clock signal received from said printer.

6. A read-only memory for supplying font data to a printer, comprising:

a read-only memory array including an EPROM (Electrically Programmable ROM) having a plurality of cells in each of which said font data is capable of being stored, decoder means responsive to an externally applied address signal for reading out said font data as parallel data from the address designated; and information holding means for holding said parallel data read out from said read-only memory array and supplying said font data as serial data in response to an externally applied clock signal received from said printer.

7. A read-only memory for supplying font data to a printer, comprising:

a read-only memory array including an EEPROM (Electrically Erasable and Programmable ROM) having a plurality of cells in each of which said font data is capable of being stored, decoder means responsive to an externally applied address signal for reading out said font data as parallel data from the address designated; and information holding means for holding said parallel data read out from said read-only memory array and supplying said font data as serial data in response to an externally applied clock signal received from said printer.

8. A read-only memory for supplying font data to a printer, comprising:

a read-only memory array having a plurality of cells in each of which said font data is capable of being stored, decoder means responsive to an externally applied address signal for reading out said font data as parallel data from the address designated; and information holding means for holding said parallel data read out from said read-only memory array and supplying said font data as serial data in response to an externally applied clock signal received from said printer, wherein said font data is inalterably and permanently stored in said plurality of memory cells.

* * * * *